(12) United States Patent
Fan et al.

(10) Patent No.: US 12,617,732 B2
(45) Date of Patent: May 5, 2026

(54) CONCRETE PROTECTION MATERIAL, AND PREPARATION METHOD AND CONSTRUCTION METHOD THEREFOR

(71) Applicants: NATIONAL ENGINEERING RESEARCH CENTER OF HIGH-SPEED RAILWAY CONSTRUCTION TECHNOLOGY, Hunan (CN); CHINA RAILWAY NO.4 ENGINEERING GROUP CO., LTD, Anhui (CN); ANHUI ENGINEERING MATERIAL TECHNOLOGY CO, LTD OF CTCE GROUP, Anhui (CN)

(72) Inventors: Dongdong Fan, Anhui (CN); Hai Huang, Anhui (CN); Jianfeng Wen, Anhui (CN); Jianwei Peng, Anhui (CN); Zhiyong Wang, Anhui (CN); Yitao Chen, Anhui (CN); Chenhao Wu, Anhui (CN); Jianan Yao, Anhui (CN); Jie Tang, Anhui (CN); Juan Chen, Anhui (CN); Chunhong Lin, Anhui (CN); Xianzhu Hu, Anhui (CN); Zhiwu Yu, Anhui (CN)

(73) Assignees: NATIONAL ENGINEERING RESEARCH CENTER OF HIGH-SPEED RAILWAY CONSTRUCTION TECHNOLOGY, Hunan (CN); CHINA RAILWAY NO. 4 ENGINEERING GROUP CO., LTD., Anhui (CN); ANHUI ENGINEERING MATERIAL TECHNOLOGY CO, LTD OF CTCE GROUP, Anhui (CN)

( * ) Notice: Subject to any disclaimer, the term of this patent is extended or adjusted under 35 U.S.C. 154(b) by 0 days.

(21) Appl. No.: 18/267,099

(22) PCT Filed: Nov. 21, 2022

(86) PCT No.: PCT/CN2022/133233
§ 371 (c)(1),
(2) Date: Jun. 14, 2023

(87) PCT Pub. No.: WO2024/016538
PCT Pub. Date: Jan. 25, 2024

(65) Prior Publication Data
US 2024/0116829 A1 Apr. 11, 2024

(30) Foreign Application Priority Data
Jul. 20, 2022 (CN) .......................... 202210856916.1

(51) Int. Cl.
C04B 41/45 (2006.01)
C04B 41/46 (2006.01)
C04B 41/49 (2006.01)
C04B 41/50 (2006.01)

(52) U.S. Cl.
CPC ...... *C04B 41/4905* (2013.01); *C04B 41/4535* (2013.01); *C04B 41/463* (2013.01); *C04B 41/5035* (2013.01)

(58) Field of Classification Search
CPC .... C04B 41/009; C04B 41/68; C04B 2111/27
See application file for complete search history.

(56) References Cited

U.S. PATENT DOCUMENTS

2007/0098911 A1 5/2007 Cho et al.

FOREIGN PATENT DOCUMENTS

| | | | | |
|---|---|---|---|---|
| AU | 2017100110 A4 * | 3/2017 | ......... | C04B 41/5035 |
| CN | 101734945 | 6/2010 | | |
| CN | 103275616 | 9/2013 | | |
| CN | 103787612 | 5/2014 | | |
| CN | 104045264 | 9/2014 | | |
| CN | 104789117 | 7/2015 | | |
| CN | 105601162 | 5/2016 | | |
| CN | 105712740 | 6/2016 | | |
| CN | 108530105 | 9/2018 | | |
| CN | 108753100 | 11/2018 | | |
| CN | 110655417 | 1/2020 | | |
| CN | 108753100 B * | 5/2020 | .............. | C09D 7/65 |
| CN | 115160841 | 10/2022 | | |
| JP | 2009091167 | 4/2009 | | |

OTHER PUBLICATIONS

Machine translation of Wang (CN103275616A ), Sep. 4, 2013.*
Machine translation of Zhang (CN108753100), May 5, 2020.*
"International Search Report (Form PCT/ISA/210) of PCT/CN2022/133233," mailed on Feb. 24, 2023, pp. 1-4.

* cited by examiner

*Primary Examiner* — Jun Li
(74) *Attorney, Agent, or Firm* — JCIPRNET

(57) ABSTRACT

Disclosed in the present application are a concrete protection material, and a preparation method and a construction method therefor. The concrete protection material consists of 50%-90% of a component A and 10%-50% of a component B in percentage by weight, where the component A is prepared from 30%-65% of organic silicon, 2%-5% of nano-silicon dioxide and the balance of an organic solvent in percentage by weight; and the component B is prepared from 20%-50% of an organic base and the balance of water in percentage by weight. The present application not only can form nano-particles having a strengthening effect in capillary channels of a concrete surface layer, but also can achieve a technical effect of superhydrophobicity on the concrete surface layer.

7 Claims, No Drawings

CONCRETE PROTECTION MATERIAL, AND PREPARATION METHOD AND CONSTRUCTION METHOD THEREFOR

CROSS-REFERENCE TO RELATED APPLICATION

The present application is a 371 of international application of PCT application serial no. PCT/CN2022/133233, filed on Nov. 21, 2022, which claims the priority of Chinese Patent Application No. 202210856916.1 filed with the China National Intellectual Property Administration on Jul. 20, 2022, and entitled "Concrete protection material, and preparation method and construction method therefor", which is incorporated by reference herein in its entirety as part of the present application.

TECHNICAL FIELD

The present application relates to the technical field of building materials, and particularly relates to a concrete protection material, and a preparation method and a construction method therefor.

RELATED ART

Statistically, an annual loss of existing concrete projects and their components in China caused by corrosion and deterioration has accounted for about 3.5-5% of the gross national product, and about half of the existing buildings have entered the aging stage. The above problems can be effectively solved by using concrete protection materials for protection of existing concrete buildings.

The existing concrete protection materials can be roughly divided into two types: organic and non-organic. Specifically, the organic protection materials mainly include coatings, rolls, etc., and the non-organic protection materials are mainly silicate impermeability reinforcing materials. An organic protective coating is disclosed in the patent "emulsion-type waterproof and mildew-proof organic silicon waterproofing agent" (CN 103787612 A). But after the protective coating is sprayed to a concrete surface, lower molecular weight silicone will gradually evaporate, and higher molecular weight silicone prepolymers cannot permeate into the concrete because of the large molecular weight, and thus gradually lose the protective effect after ultraviolet light irradiation and rainwater washing. A silicate impermeability reinforcing material is disclosed in the patent "all-water-sample inorganic permeable crystalline waterproofing agent and preparation method therefor" (CN 108530105 A). However, silicate materials are less durable, and also likely to cause problems such as concrete saltpetering.

SUMMARY OF INVENTION

In view of this, the present application provides a concrete protection material, and a preparation method and a construction method therefor, to solve the problems in the background art. Not only nano-particles having a strengthening effect in capillary channels of a concrete surface layer can be formed, but also a technical effect of superhydrophobicity on the concrete surface layer can be achieved.

In order to achieve the above objective, the present application provides the following technical solutions.

An aspect of the present application discloses a concrete protection material, consisting of 50%-90% of a component A and 10%-50% of a component B in percentage by weight, wherein the component A is prepared from 30%-65% of organic silicon, 2%-5% of nano-silicon dioxide and the balance of an organic solvent in percentage by weight; and the component B is prepared from 20%-50% of an organic base and the balance of water in percentage by weight.

As a further solution of the present application, in the component A, the organic silicon is at least one of tetraethyl orthosilicate, methyltriethoxysilane, triethoxyisobutylsilane, triethoxyoctylsilane, and octacyclotetrasiloxane "D4".

As a further solution of the present application, in the component A, the organic solvent is at least one of methanol and ethanol.

As a further solution of the present application, in the component A, the nano-silicon dioxide is spherical-like nano-particles with a mean diameter of 6 nm-8 nm after being surface-treated with octacyclotetrasiloxane "D4".

As a further solution of the present application, in the component B, the organic base is at least one of trimethyl hydroxide (ethyl) ammonium, sodium methylsiliconate, and pyridine.

Another aspect of the present application discloses a preparation method for a concrete protection material according to any one described above, and the method includes the following steps:

S1, weighing organic silicon, an organic solvent and nano-silicon dioxide in percentage by weight, and stirring same uniformly at a normal temperature, to obtain a component A; and S2, weighing an organic base and water in percentage by weight, and stirring same at a normal temperature until dissolved, to obtain a component B.

Yet another aspect of the present application discloses a construction method for a concrete protection material according to any one described above, and the method includes the following steps: mixing and stirring a component A and a component B uniformly in percentage by weight, and brushing or spraying same on a concrete surface.

Compared with the prior art, the present application has the following beneficial effects.

1. The organic silicon used in the present application is a low-molecular-weight, high-permeation organic silicon material, and is permeable into capillary channels of concrete, and under the action of an organic base, hydrophobic nano-particles are generated, which not only can improve compactness of a concrete surface and achieve an enhanced effect, but also can achieve a super-hydrophobic effect on the concrete surface.

2. The nano-silicon dioxide material is used in the present application, which not only provides nucleation sites of nano-particles for hydrolysis and polycondensation of the organic silicon material, but also accelerates a hydrolysis and polycondensation reaction of the organic silicon, prevents the organic silicon from permeating into the concrete, and improves a conversion rate of the organic silicon forming a nano material on a concrete surface layer. After the octacyclotetrasiloxane "D4" modified silicon dioxide is added, the octacyclotetrasiloxane "D4" on a surface of the nano-silicon dioxide reacts with other organic silicones in the component A, so as to reinforce the binding between a hydrophobic nano-material generated by the silicone reaction in the component A and the nano-silicon dioxide.

3. The organic base is used as a catalyst in the present application, which effectively solves a technical problem of low solubility of an inorganic base in an organic solvent/water mixed solution, facilitates contact between molecules of various components, and increases a reaction rate of a system.

DESCRIPTION OF EMBODIMENTS

To facilitate an understanding of the present application, the present application will be described more fully hereinafter with reference to the specific examples. However, the present application may be implemented in many different forms and is not limited to the implementation modes described herein. Rather, these implementation modes are provided to understand the disclosed content of the present application more thoroughly and completely.

Unless defined otherwise, all technical and scientific terms used herein have the same meaning as commonly understood by those skilled in the art to which the present application belongs. The terms used in the specification of the present application herein are for the purpose of describing specific implementation modes merely and are not intended to limit the present application.

Specific information about raw materials used in the following examples and comparative examples is as follows.
Component A:
  organic silicon: tetraethyl orthosilicate is purchased from Shanghai Meryer Chemical Technology Co., Ltd., with a brand of C10002L;
  methyltriethoxysilane is purchased from Qufu Yishun Chemical Co., Ltd., and with a brand of MTES;
  triethoxyisobutylsilane is purchased from Shandong Moer Chemical Co., Ltd., with a brand of 101;
  triethoxyoctylsilane is purchased from Shandong Huanzheng Chemical Industry Co., Ltd., with a brand KH832; and
  octacyclotetrasiloxane "D4" is purchased from Jinan Jinbang Chemical Co., Ltd., with a brand of PMX0244;
  organic solvent: methanol is purchased from Shandong Yushuo Chemical Co., Ltd.; and ethanol is purchased from Dining Bocheng Chemical Co., Ltd.; and
  nano-silicon dioxide: purchased from Ningbo Beigaer New Material Co., Ltd., with a brand of B—SiO$_2$-7N.
Component B:
  organic base: trimethyl hydroxide (ethyl) ammonium is purchased from Shanghai Zhixin Chemical Co., Ltd., with a brand of 123-41-1;
  sodium methylsiliconate is purchased from Suzhou Tengtai Chemical Technology Co., Ltd., with a brand of 190818; and
  pyridine is purchased from Nantong Runfeng Petrochemical Co., Ltd., with a brand of 3027.

All materials are commercially available common products.

It can be understood that the above raw material reagents are merely examples of some particular implementation modes of the present application to make the technical solutions of the present application clearer, and do not represent that the present application can only use the above reagents, which specifically lies in the scopes of the claims. Moreover, "parts" described in examples and comparative examples, unless otherwise specified, all refer to parts by weight.

Any ranges recited in the present application are inclusive of end values, any numerical value between the end values, and any sub-ranges consisting of the end values or any numerical value between the end values.

Preparation of the components in the following examples and comparative examples is carried out at a normal temperature.

Example 1

Preparation of a component A: 50 parts of tetraethyl orthosilicate, 46 parts of methanol and 4 parts of nano-silicon dioxide were weighed and stirred uniformly to obtain the component A.

Preparation of a component B: 35 parts of trimethyl hydroxide (ethyl) ammonium and 65 parts of water were weighed and stirred to be dissolved to obtain the component B.

Preparation of a concrete protection material: 70 parts of the component A and 30 parts of the component B were weighed and stirred uniformly for use.

Example 2

Preparation of a component A: 30 parts of methyltriethoxysilane, 68 parts of ethanol and 2 parts of nano-silicon dioxide were weighed and stirred uniformly to obtain the component A.

Preparation of a component B: 20 parts of sodium methylsiliconate and 80 parts of water were weighed and stirred to be dissolved to obtain the component B.

Preparation of a concrete protection material: 70 parts of the component A and 30 parts of the component B were weighed and stirred uniformly for use.

Example 3

Preparation of a component A: 65 parts of triethoxyisobutylsilane, 30 parts of ethanol and 5 parts of nano-silicon dioxide were weighed and stirred uniformly to obtain the component A.

Preparation of a component B: 20 parts of pyridine and 80 parts of water were weighed and stirred to be dissolved to obtain the component B.

Preparation of a concrete protection material: 50 parts of the component A and 50 parts of the component B were weighed and stirred uniformly for use.

Example 4

Preparation of a component A: 30 parts of triethoxyoctylsilane, 68 parts of ethanol and 2 parts of nano-silicon dioxide were weighed and stirred uniformly to obtain the component A.

Preparation of a component B: 50 parts of pyridine and 50 parts of water were weighed and stirred to be dissolved to obtain the component B.

Preparation of a concrete protection material: 90 parts of the component A and 10 parts of the component B were weighed and stirred uniformly for use.

Example 5

Preparation of a component A: 10 parts of tetraethyl orthosilicate, 10 parts of methyltriethoxysilane, 10 parts of triethoxyisobutylsilane, 20 parts of triethoxyoctylsilane, 10 parts of octacyclotetrasiloxane "D4", 35 parts of ethanol and 5 parts of nano-silicon dioxide were weighed and stirred uniformly to obtain the component A.

Preparation of a component B: 20 parts of trimethyl hydroxide (ethyl) ammonium, 20 parts of sodium methylsiliconate, 10 parts of pyridine and 50 parts of water were weighed and stirred to be dissolved to obtain the component B.

Preparation of a concrete protection material: 70 parts of the component A and 30 parts of the component B were weighed and stirred uniformly for use.

Comparative Example 1

Preparation of a component A: 30 parts of methyltriethoxysilane, 68 parts of ethanol and 2 parts of nano-silicon dioxide were weighed and stirred uniformly to obtain the component A.

Preparation of a component B: 20 parts of sodium hydroxide and 80 parts of water were weighed and stirred to be dissolved to obtain the component B.

Preparation of a concrete protection material: 70 parts of the component A and 30 parts of the component B were weighed and stirred uniformly for use.

Comparative Example 2

Preparation of a component A: 30 parts of methyltriethoxysilane and 70 parts of ethanol were weighed and stirred uniformly to obtain the component A.

Preparation of a component B: 20 parts of sodium methylsiliconate and 80 parts of water were weighed and stirred to be dissolved to obtain the component B.

Preparation of a concrete protection material: 70 parts of the component A and 30 parts of the component B were weighed and stirred uniformly for use.

Comparative Example 3

Preparation of a component A: 30 parts of methyltriethoxysilane, 68 parts of ethanol and 2 parts of nano-silicon dioxide were weighed and stirred uniformly to obtain the component A.

Preparation of a component B: 100 parts of water were weighed and stirred to be dissolved to obtain the component B.

Preparation of a concrete protection material: 70 parts of the component A and 30 parts of the component B were weighed and stirred uniformly for use.

The above Examples 1-5 and Comparative Examples 1-3 are sprayed and constructed on a surface of a C20 concrete layer, the amounts of the effective components of the protective materials of all cases used per square meter of concrete are consistent, and relevant tests are performed according to test items and test standards shown in table 1. Test results are shown in table 2.

TABLE 1

| Test items and methods | |
| --- | --- |
| Test item | Test method |
| Rebound value | JGJ/T23-2001 "Technical specification for inspecting of concrete compressive strength by rebound method" |
| Hydrophobicity | JC/T 2168-2013 "Self-cleaning coated glass" |
| Permeability | Water spray color-developing method |

TABLE 2

| | Test results | | | |
| --- | --- | --- | --- | --- |
| Case | Solid content/% | Rebound value/MPa | Hydrophobicity | Permeating depth of material/mm |
| Example 1 | 48.3 | 27.6 | 112 | 2.3 |
| Example 2 | 28.4 | 25.5 | 134 | 3.6 |
| Example 3 | 45.0 | 26.3 | 146 | 2.9 |
| Example 4 | 33.8 | 23.8 | 147 | 5.4 |
| Example 5 | 60.5 | 25.9 | 142 | 3.7 |
| Comparative Example 1 | 28.4 | 23.2 | 133 | 4.5 |
| Comparative Example 2 | 27.0 | 23.6 | 133 | 4.3 |
| Comparative Example 3 | 30.0 | 21.2 | 130 | 5.9 |
| Blank test block | / | 21.3 | / | / |

Note: the blank test block is a concrete test block that was not treated with a protection material.

It can be seen from data in Table 2 that the concrete protection material in the present application has a better effect of surface layer reinforcing and hydrophobicity. It can be seen from Examples 1-4 that the larger a hydrophobic group of the used organic silicon material, the better the hydrophobicity of the protection material.

It can be seen from comparative data analysis of Example 2 and Comparative Examples 1-2 that both adding nano-silicon dioxide and using an organic base to replace an inorganic base can effectively improve a reaction rate of the protection material, so as to reduce a permeating depth of the material in the capillary channels of concrete, and improve the compactness and strength of the capillary channels of a concrete surface layer.

It can be seen from comparative data analysis of Example 2, Comparative Example 3 and the blank test block that when no organic base is added to the organic silicon material, the protection material only has a hydrophobic effect without compactness reinforcing effect. Although the specification is described in terms of implementation modes, not every implementation mode contains only one independent technical solution, the recitation of the specification is for clarity only, those skilled in the art should refer to the specification as a whole, and the technical solutions in the various examples may also be combined as appropriate to form other implementation modes that may be understood by those skilled in the art.

Therefore, the foregoing descriptions are merely the preferred examples of the present application, are not intended to limit a scope of implementation of the present application, that is, various equivalent transformations made according to a range of the claims of the present application fall within the scope of protection of the present application.

What is claimed is:

1. A concrete protection material, consisting of 50%-90% of a component A and 10%-50% of a component B in percentage by weight, wherein the component A consisting of 30%-65% of organic silicon, 2%-5% of nano-silicon dioxide and the balance of an organic solvent in percentage by weight; and the component B consisting of 20%-50% of an organic base and the balance of water in percentage by weight.

2. The concrete protection material according to claim 1, wherein in the component A, the organic silicon is at least one of tetraethyl orthosilicate, methyltriethoxysilane, triethoxyisobutylsilane, triethoxyoctylsilane, and octacyclotetrasiloxane.

3. The concrete protection material according to claim 1, wherein in the component A, the organic solvent is at least one of methanol and ethanol.

4. The concrete protection material according to claim 1, wherein in the component A, the nano-silicon dioxide is spherical-like nano-particles with a mean diameter of 6 nm-8 nm after being surface-treated with octacyclotetrasiloxane.

5. The concrete protection material according to claim 1, wherein in the component B, the organic base is at least one of trimethyl hydroxide (ethyl) ammonium, sodium methylsiliconate, and pyridine.

6. A preparation method for a concrete protection material according to claim 1, comprising:

S1, weighing organic silicon, an organic solvent and nano-silicon dioxide in percentage by weight, and stirring same uniformly at a normal temperature, to obtain a component A; and S2, weighing an organic base and water in percentage by weight, and stirring same at a normal temperature until dissolved, to obtain a component B.

7. A construction method for a concrete protection material according to claim 1, wherein a component A and a component B are mixed and stirred uniformly in percentage by weight, and are brushed or sprayed on a concrete surface.

* * * * *